United States Patent

Sumiyama et al.

[11] Patent Number: 6,055,461
[45] Date of Patent: Apr. 25, 2000

[54] NUMERICAL CONTROL APPARATUS HAVING NUMERIC DATA DISPLAY FUNCTION

[75] Inventors: Go Sumiyama; Kenji Ito, both of Aichi, Japan

[73] Assignee: Okuma Corporation, Aichi, Japan

[21] Appl. No.: 08/974,398

[22] Filed: Nov. 19, 1997

[30] Foreign Application Priority Data

Nov. 27, 1996 [JP] Japan ................................. 8-316093

[51] Int. Cl.[7] ........................................... G06F 3/04
[52] U.S. Cl. ............................................. 700/175; 700/83
[58] Field of Search ............................ 700/83, 174, 180, 700/184, 185, 173, 182

[56] References Cited

U.S. PATENT DOCUMENTS

| | | | |
|---|---|---|---|
| 3,698,268 | 10/1972 | Cutler | 364/474.16 |
| 4,490,781 | 12/1984 | Kishi et al. | 364/474.27 |
| 4,635,183 | 1/1987 | Isobe et al. | 364/188 |
| 4,648,028 | 3/1987 | DeKlotz et al. | 364/188 |
| 4,788,481 | 11/1988 | Niwa | 364/474.26 |
| 5,177,689 | 1/1993 | Kinasi et al. | 364/474.26 |
| 5,663,886 | 9/1997 | Lueck | 364/474.22 |
| 5,831,407 | 11/1998 | Ouchi et al. | 364/474.26 |

*Primary Examiner*—William Grant
*Assistant Examiner*—Kidest Bahta
*Attorney, Agent, or Firm*—Wenderoth, Lind & Ponack, L.L.P.

[57] ABSTRACT

The object of the present invention is to make it possible to obtain information on a plurality of working conditions at one time from a display unit even if an operator is away from the display unit. To confirm a cutting condition or the like, the operator selects a display using large characters giving priority to the visibility from a distance. A display attribute change information determination section classifies numeric data sent from a working condition detection section in accordance with working condition classification information sent from a working condition classification information storage section and sends a classification result as display attribute change information. A display control section specifies a designated display attribute in accordance with the display attribute change information and outputs the attribute to a display unit.

20 Claims, 9 Drawing Sheets

|  | NAM | CLR | LBL | POS | FNT |
|---|---|---|---|---|---|
|  | NAME OF NUMERIC DATA | DISPLAY COLOR | LABEL NAME | DISPLAY POSITION | DISPLAY FONT |
| AT(0) | PRESENT POSITION OF X AXIS | BLACK | 'X' | (100, 100) | 64DOTS |
| AT(1) | PRESENT POSITION OF Y AXIS | BLACK | 'Y' | (100, 200) | 64DOTS |
| AT(2) | PRESENT POSITION OF Z AXIS | BLACK | 'Z' | (100, 300) | 64DOTS |
| AT(3) | ROTATION SPEED OF SPINDLE | BLACK | 'S' | (100, 400) | 64DOTS |
| AT(4) |  |  |  |  |  |

| NAM | REF | CLR1 | CLR2 | CLR3 | LBL | POS | FNT |
|---|---|---|---|---|---|---|---|
| NAME OF NUMERIC DATA | NAME OF WORKING CONDITION CLASSIFICATION NUMERIC DATA | DISPLAY COLOR 1 | DISPLAY COLOR 2 | DISPLAY COLOR 3 | LABEL NAME | DISPLAY POSITION | DISPLAY FONT |
| AT'(0) PRESENT POSITION OF X AXIS | MOTOR LOAD AMOUNT OF X AXIS | LIGHT GRAY | DARK GRAY | BLACK | 'X' | (100,100) | 64DOTS |
| AT'(1) PRESENT POSITION OF Y AXIS | MOTOR LOAD AMOUNT OF Y AXIS | LIGHT GRAY | DARK GRAY | BLACK | 'Y' | (100,200) | 64DOTS |
| AT'(2) PRESENT POSITION OF Z AXIS | MOTOR LOAD AMOUNT OF Z AXIS | LIGHT GRAY | DARK GRAY | BLACK | 'Z' | (100,300) | 64DOTS |
| AT'(3) ROTATION SPEED OF SPINDLE | MOTOR LOAD AMOUNT OF SPINDLE | LIGHT GRAY | DARK GRAY | BLACK | 'S' | (100,400) | 64DOTS |
| AT'(4) | | | | | | | |

FIG.7

| NAME OF WORKING CONDITION CLASSIFICATION NUMERIC DATA | BOUNDARY VALUE 1 | BOUNDARY VALUE 2 |
|---|---|---|
| MOTOR LOAD AMOUNT OF X AXIS | 50 (%) | 100 (%) |
| MOTOR LOAD AMOUNT OF Y AXIS | 50 (%) | 100 (%) |
| MOTOR LOAD AMOUNT OF Z AXIS | 50 (%) | 100 (%) |
| MOTOR LOAD AMOUNT OF SPINDLE | 50 (%) | 100 (%) |

REF — CMP1 — CMP2

NUMERICAL CONTROL APPARATUS HAVING NUMERIC DATA DISPLAY FUNCTION

BACKGROUND OF THE INVENTION

1. Field of the Invention

The present invention relates to a numerical control apparatus having a plurality of display attributes. Particularly, the present invention relates to a numerical control apparatus having a numeric data display function for displaying the position of a feed rod or the rotation speed of a rotational shaft based on display attributes according to working conditions of the feed rod or the rotational shaft.

2. Description of the Related Art

Numeric data on a display apparatus is displayed based on a combination of predetermined display attributes. The numeric data includes, for example, data indicating working conditions of a machine, such as, the position of the feed rod and the rotation speed of the rotational shaft. In addition, data indicating the working conditions of the feed rod, such as, a motor load, a cutting feed or a rapid traverse, are converted into numeric values and used as the numeric data. Meanwhile, the display attributes include, for example, display position, display color, variable density, and character font. A plurality of combinations of the display attributes for one piece of the numeric data are prepared. By so doing, it is possible to switch between a plurality of image displays prepared in accordance with specific purposes, such as, displaying a few pieces of the numeric data using large characters if priority is given to visibility and displaying many pieces of the numeric data using small characters if priority is given to the amount of information.

Figure 1:
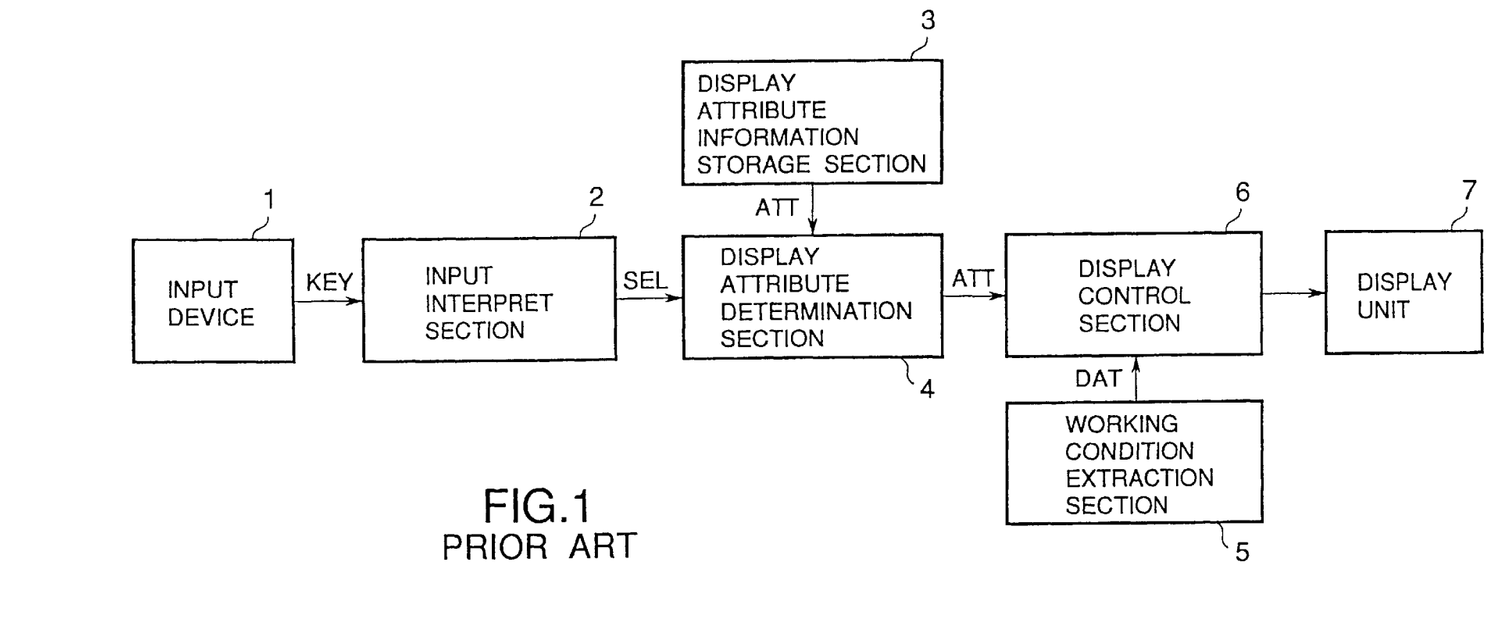
FIG. 1 is a block diagram showing an example of the structure of a conventional numerical control apparatus having a numeric data display function.

FIG. 1 is a block diagram showing an example of a conventional numerical control apparatus having a numeric data display function. The conventional numerical control apparatus having a numeric value display function will now be described with reference to FIG. 1.

An input interpret section 2 interprets an input KEY from an input device 1 and sends a result as a display image designation SEL to a display attribute determination section 4. Here, the display image designation SEL is data for designating a specific display image from a plurality of display images. A display attribute information storage section 3 stores combinations of display attributes registered in advance for every display image. The display attribute determination section 4 extracts a designated display attribute ATT in accordance with the display image designation SEL from the combinations of display attributes stored in the display attribute information storage section 3. A working condition extraction section 5 detects working conditions of a machine such as the position of the feed rod or the rotation speed of a spindle, converts the conditions into numeric data DAT and sends of a spindle, converts the conditions into numeric data DAT and sends the numeric data DAT to a display control section 6. The display control section 6 outputs the numeric data DAT to a display unit 7 in accordance with the designated display attribute ATT.

Figure 2:
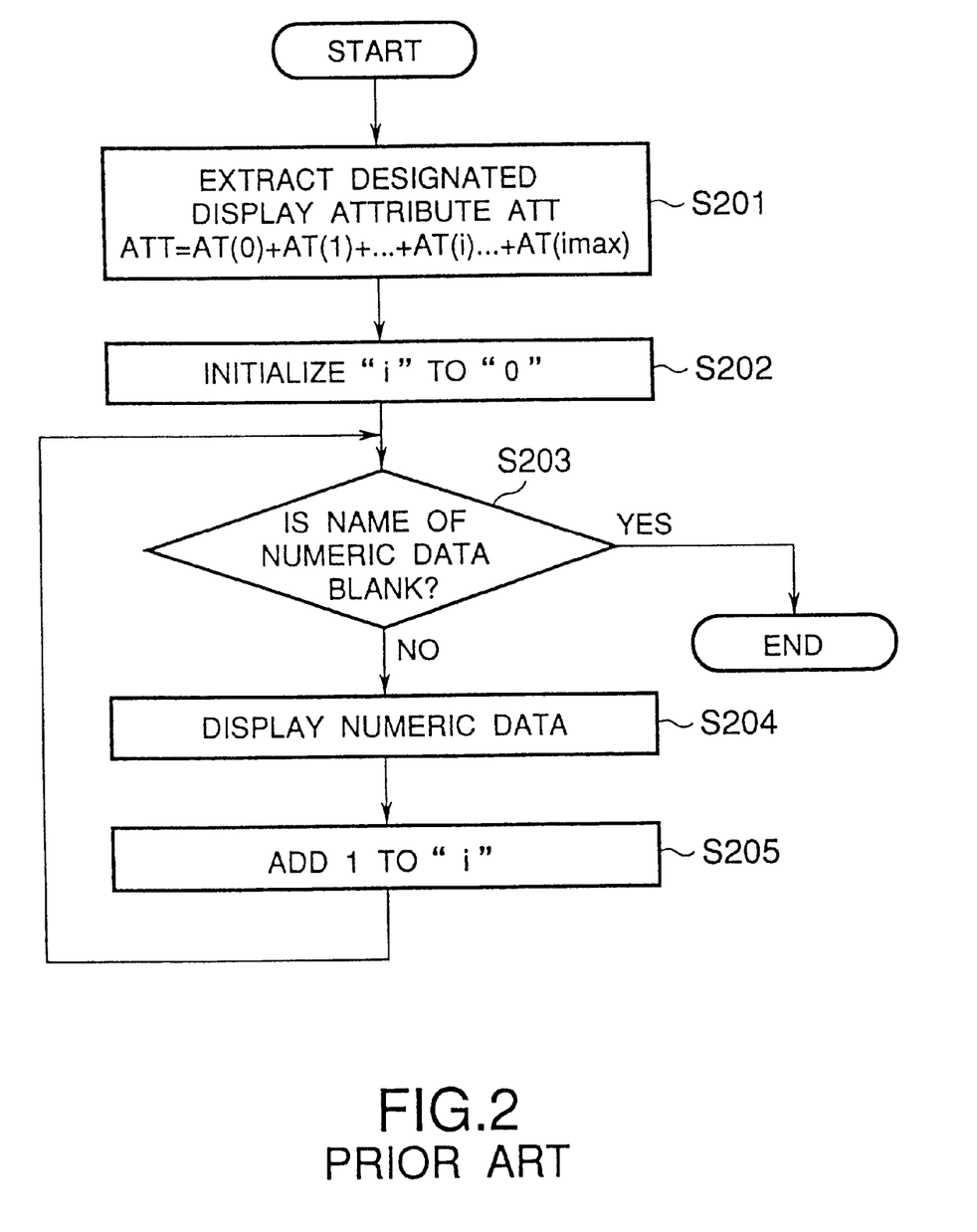
FIG. 2 is a flowchart showing an example of the display processing of numeric data in the conventional apparatus.

FIG. 2 is a flowchart showing an example of the display process of the display attribute information storage section 3, the display attribute determination section 4 and the display control section 6 in FIG. 1. Display procedures of the prior art will be described with reference to the flowchart of FIG. 2.

First, the designated display attribute ATT in accordance with the display image plane designation SEL is determined from the combinations of display attributes stored in the display attribute information storage section 3. In FIG. 2, the designated display attribute ATT has a structure in which a plurality of arrangements consisting of display attributes for a plurality of numeric data are provided. If an arrangement consisting of the display attributes of respective numeric data is AT, the following expression (1) is obtained:

$$ATT = AT(0) + AT(1) + \ldots + AT(i) + \ldots + AT(\text{imax}) \quad (1)$$

In the above expression (1), a subscript "i" specifies the numeric data and a symbol "imax" is a maximum value of the subscript "i", which corresponds to the amount of numeric data which can be displayed simultaneously (Step S201).

Figure 3:
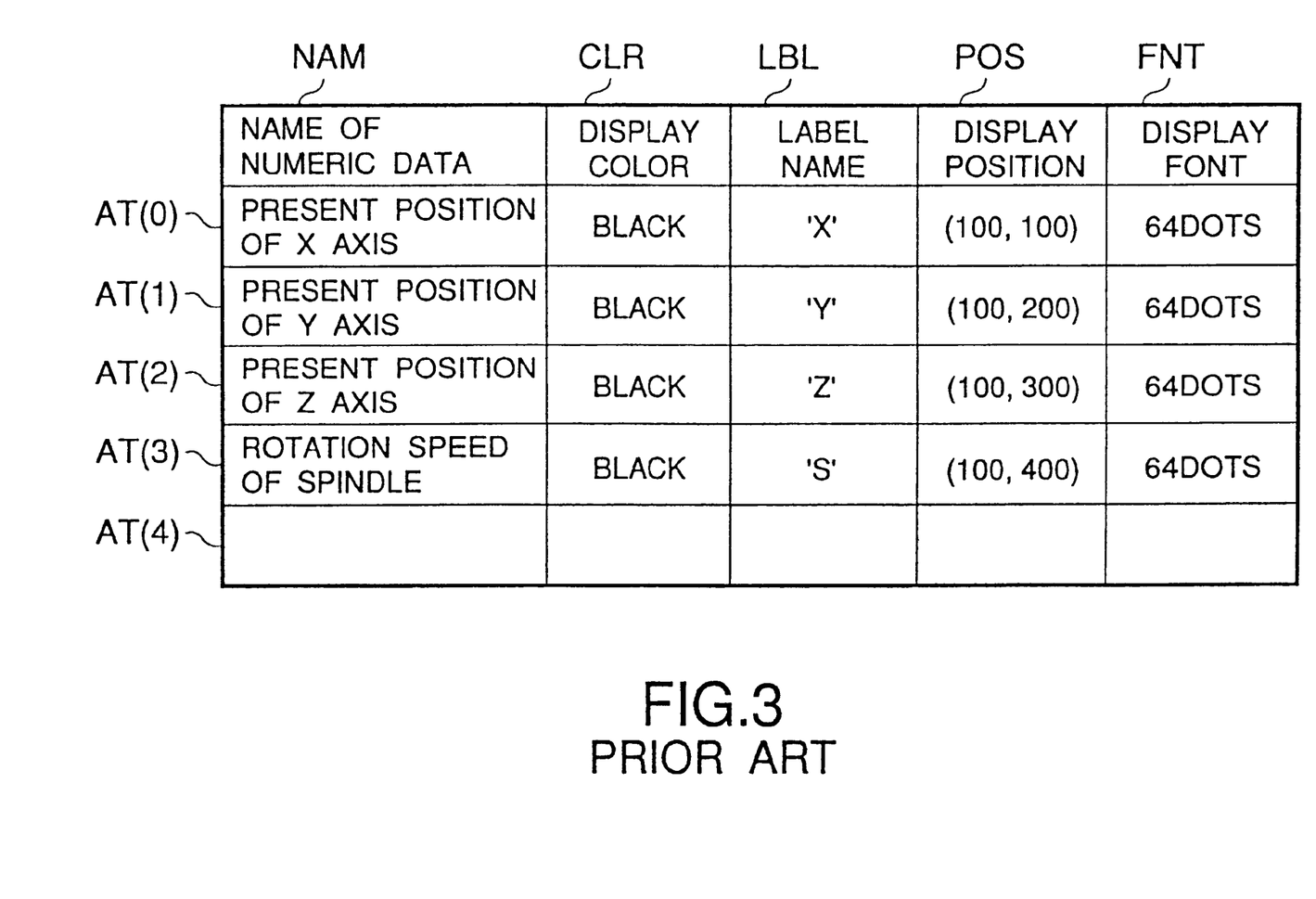
FIG. 3 shows an example of display attributes stored in the conventional apparatus.

Now, an example of the structure of the designated display attribute ATT will be described with reference to FIG. 3. The designated display attribute ATT has an added structure in which four arrangements, that is, AT(0) consisting of display attributes for the present position of an X axis, AT(1) consisting of display attributes for the present position of a Y axis, AT(2) consisting of display attributes for the present position of a Z axis and AT(3) consisting of display attributes for the rotation speed of a spindle. Constituent elements of one arrangement are a plurality of display attributes, such as, name of the numeric data NAM, display color CLR, label name LBL, display position POS and display font FNT. The attribute AT(2) in the expression (1), for example, indicates the arrangement consisting of display attributes for a numeric data specified by the subscript i=2, and indicates that the display color is black that the name (label name) of an axis "Z" and the present position of the Z axis are outputted in a 64-dot character font from a coordinate (100, 300) on the image thereof. In this example, the name NAM of the numeric value AT(4) is blank, which indicates the end of the displayed numeric data.

Referring back to FIG. 2, the subscript "i" in the expression (1) is initialized to "0" (Step S202). It is then examined whether or not the name NAM of numeric data AT(i) consisting of the display attributes of the numeric data is blank (Step S203). If the name NAM of the numeric data is not blank, the numeric data is displayed based on the display attributes of AT(i) (Step S204). Thereafter, one is added to the subscript "i" and the process returns to the Step S203 (Step S205). If the name NAM of numeric data name NAM is blank, the display process is finished at the Step S203. Procedures from the Steps S201 to S205 are repeatedly carried out and present working conditions of the machine can be thereby displayed on the display unit 1.

Figure 4:
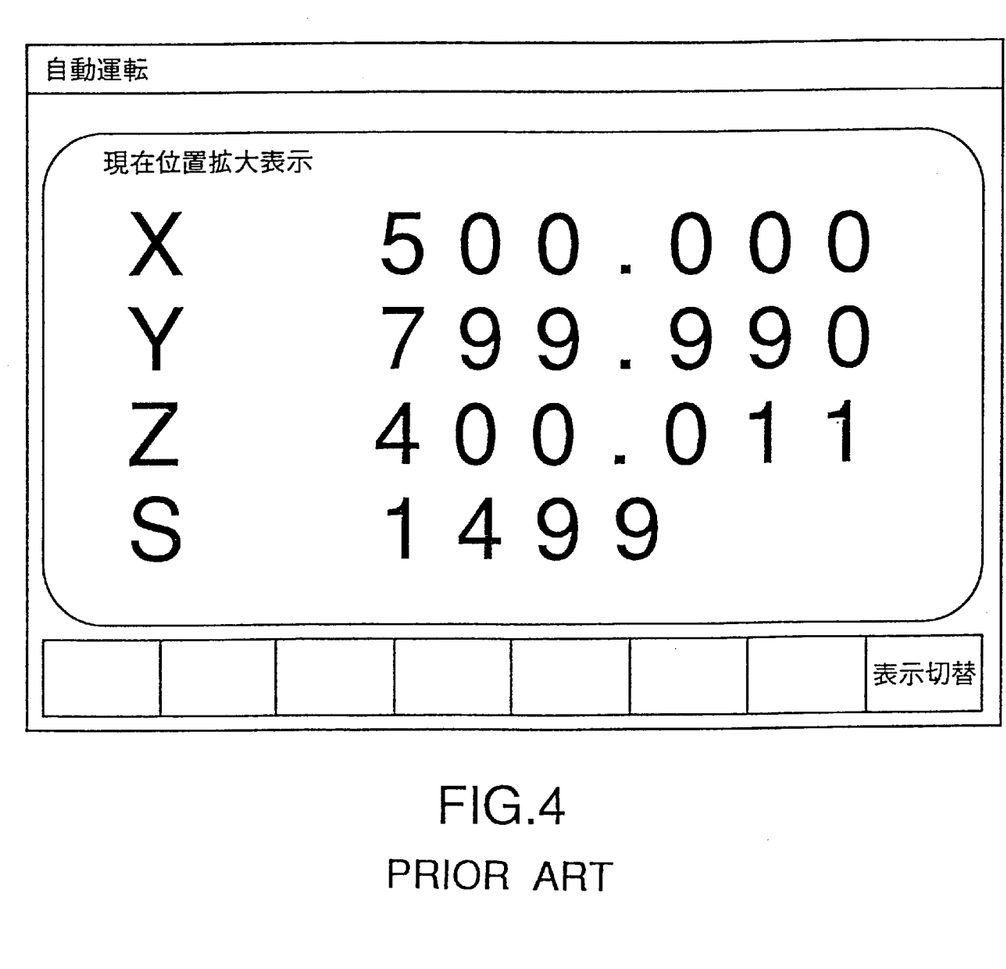
FIG. 4 shows an example of the display of the conventional apparatus.

FIG. 4 is an example of the display of the numeric data on the image by the process shown in FIG. 2. In FIG. 4, present positions of the X axis, the Y axis and the Z axis as well as the rotation speed of the spindle axis are displayed as a black, 64-dot font based on the display attributes shown in FIG. 3, respectively. The above description refers to the conventional numerical control apparatus having a numeric data display function.

If an operator is away from the display unit to confirm a cutting condition and the image is displayed using large characters, as shown in FIG. 4, in consideration of the visibility from a distance, the information obtained at one time is disadvantageously limited. It is, for example, impossible to confirm the motor load conditions of the feed rod and the rotation shaft from the display of FIG. 4. This makes it necessary for the operator to leave the working place to change the image display, thereby wasting excessive time and labor of the operator.

Conversely, if the amount of numeric data displayed simultaneously is increased on the image display to obtain more information from the display unit, it is necessary to use small characters for displaying the respective numeric data. This makes it difficult for the operator to confirm the numeric data from a position away from the display unit and, therefore, the operator is more likely to misread the displayed values.

SUMMARY OF THE INVENTION

The present invention has been made in consideration of the above-stated circumstances. It is therefore an object of the present invention to provide a numerical control apparatus having a numeric data display function capable of simultaneously displaying a plurality of working conditions on a single image display.

The present invention relates to a numerical control apparatus having a numeric data display function capable of switching between a plurality of image displays, the apparatus comprising: input means; display means; interpret means for interpreting input information from the input means; storage means for storing a plurality of display attributes of at least, characters; determination means for determining a designated display attribute in accordance with designation of the interpret means from the plurality of display attributes stored in the storage means; detection means for detecting a working condition of one of a feed rod and a rotational shaft of a machine tool for every axis; control means for displaying numeric data from the detection means in accordance with the designated display attribute from the determination means on the display means.

The above-stated object of the present invention is attained if the numerical control apparatus according to the present invention comprises classification information storage means for storing classification information on working conditions of one of the feed rod and the rotational shaft; and change information determination means for classifying the numeric data from the detection means in accordance with the classification information stored in the classification information storage means and for sending the classified numeric data to the control means as change information, thereby displaying a plurality of working conditions simultaneously.

DESCRIPTION OF THE PREFERRED EMBODIMENTS

Figure 5:
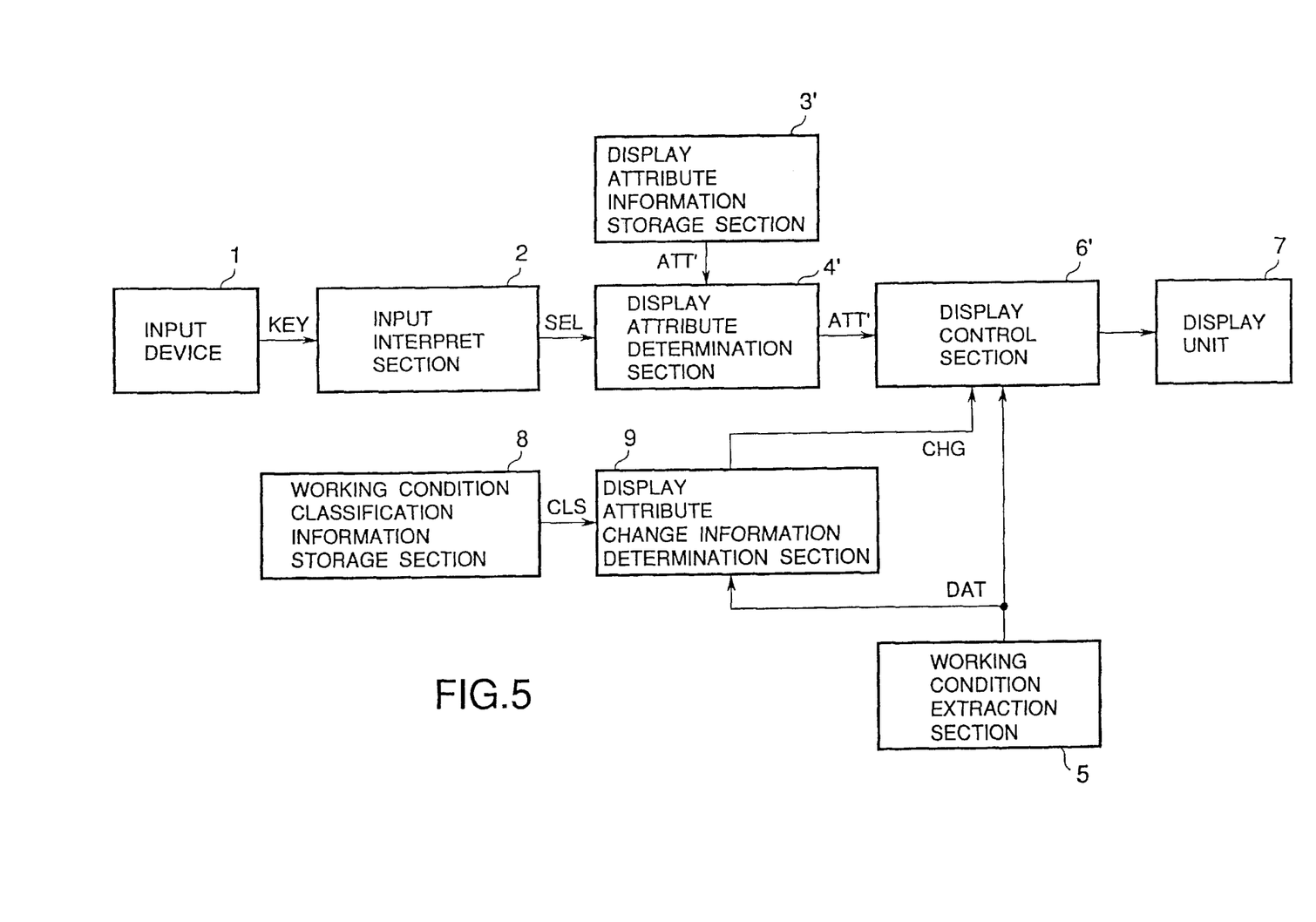
FIG. 5 is a block diagram showing an example of a numerical control apparatus having a numeric data display function according to the present invention.

FIG. 5 is a block diagram showing an embodiment of a numerical control apparatus having a numeric data display function according to the present invention. The numerical control apparatus having a numeric data display function according to the present invention will be described in detail with reference to FIG. 5.

Elements having the same functions as those in FIG. 1 which is the block diagram of the conventional apparatus are denoted by the same reference numerals and the description thereof will not be given. A display attribute information storage section 3', a display attribute determination section 4' and a display control section 6' are similar to the display attribute information storage section 3, the display attribute determination section 4 and the display control section 6 in the block diagram of the conventional apparatus as shown in FIG. 1, respectively. However, since they operate differently, they are denoted by different reference numerals, respectively.

The display attribute information storage section 3' stores combinations of the display attributes which have been registered in advance for every display image. The display attribute determination section 4' extracts a designated display attribute ATT' in accordance with the display image designation SEL from the combinations of the display attributes stored in the display attribute information storage section 3'. A working condition classification information storage section 8 stores working condition classification information CLS for classifying the numeric data on the position of the feed rod, the rotation speed of the rotational shaft and the motor load into a plurality of working conditions which can be divided into first and second sets of working conditions. A display attribute change information determination section 9 classifies the numeric data DAT sent from the working condition extraction section 5 in accordance with the working condition classification information CLS stored in the working condition classification information storage section 8, and sends the classification result to the display control section 6' as display attribute change information CHG. The display control section 6' specifies the designated display attribute ATT' in accordance with the value of the display attribute change information CHG and outputs the attribute ATT' to a display unit 7.

Figure 6:
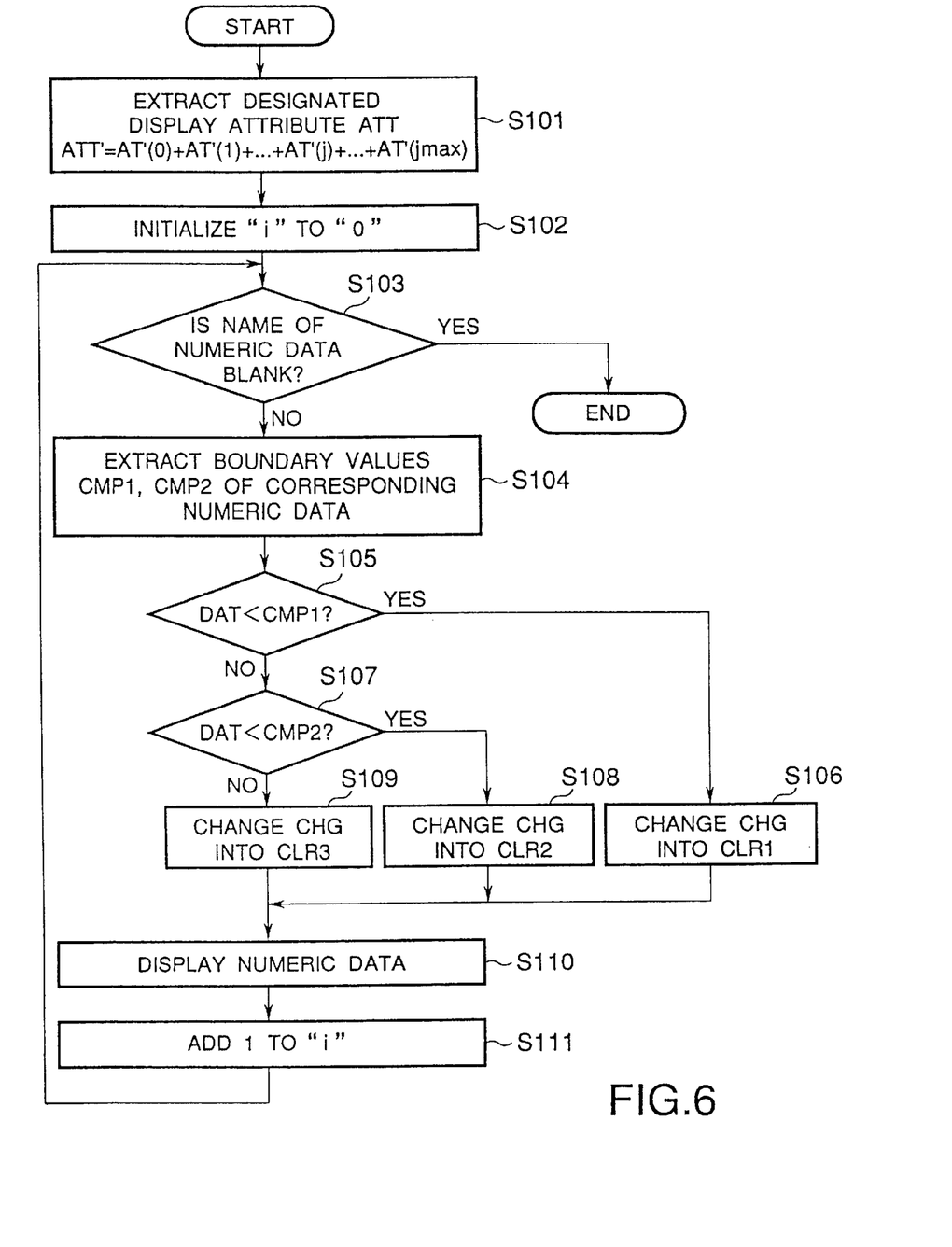
FIG. 6 is a flowchart showing an example of the display processing of numeric data in the apparatus according to the present invention.

FIG. 6 is a flowchart showing an example of the display process of the display attribute information storage section 3', the display attribute determination section 4', the display control section 6', the working condition classification information storage section 8 and the display attribute change information determination section 9.

Display procedures of the present invention will be described based on the flowchart of FIG. 6. First, from the combinations of the display attributes stored in the display attribute information storage section 3', a designated display attribute ATT' is selected in accordance with the display image designation SEL. Arrangements consisting of the display attributes on a plurality of numeric data are stored in the designated display attribute ATT'. If an arrangement consisting of the display attributes for each numeric data is AT', the following expression (2) is obtained:

$$ATT'=AT'(0)+AT'(1)+\ldots+AT'(j)+\ldots AT'(jmax) \qquad (2)$$

In the expression (2), a subscript "j" specifies the numeric data and a symbol "jmax" is a maximum of the subscript "j", which corresponds to the amount of numeric data which can be displayed simultaneously (Step S101).

Now, an example of the structure of the designated display attribute ATT' and the working condition classification information CLS will be described with reference to FIGS. 7 and 8.

Figure 7:
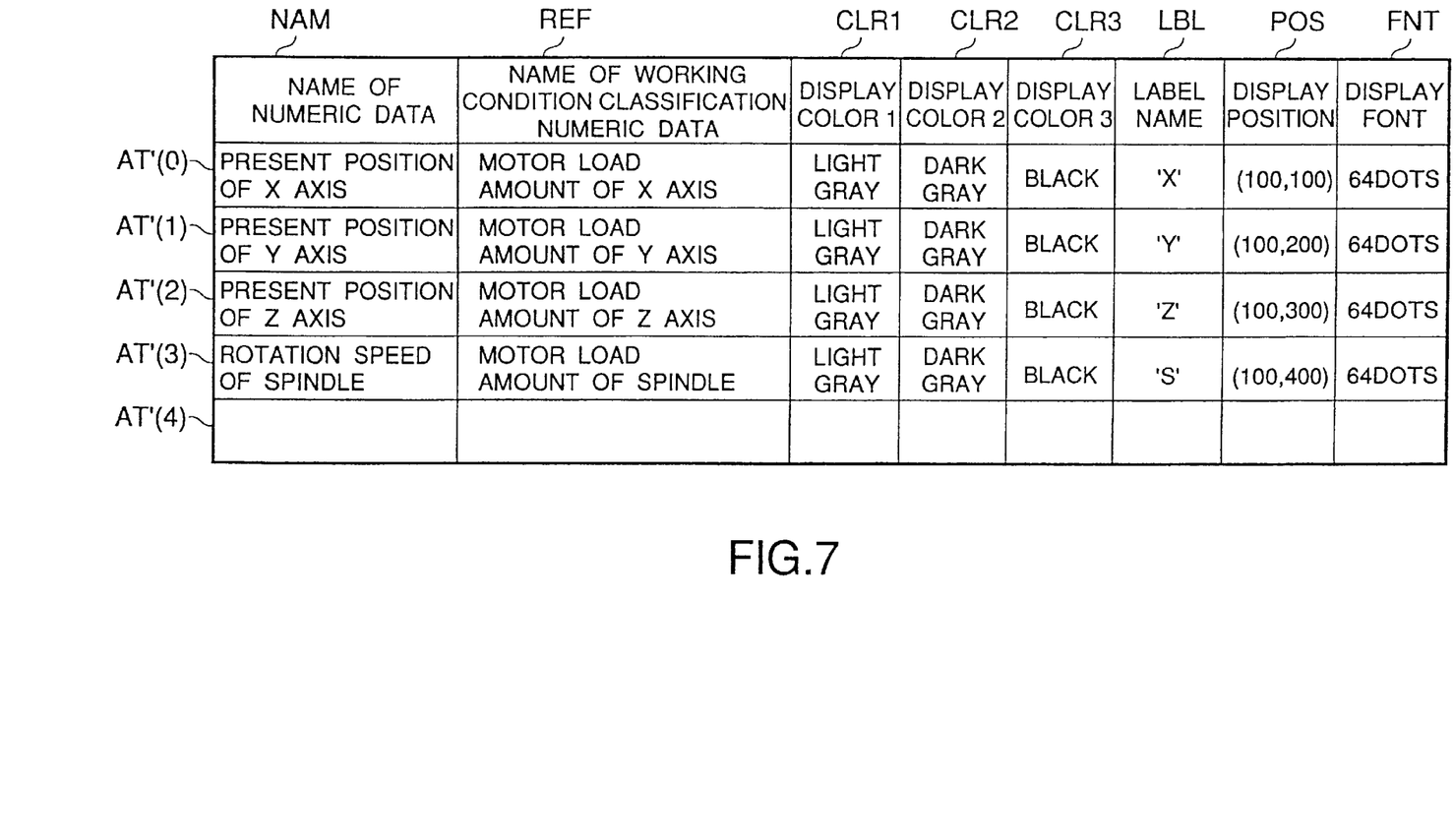
FIG. 7 shows an example of display attributes stored in the apparatus according to the present invention.

In FIG. 7, four arrangements, that is, AT'(0) consisting of the display attributes for the present position of the X axis, AT'(1) consisting of the display attributes for the present position of the Y axis, AT'(2) consisting of the display attributes for the present position of the Z axis and AT'(3) consisting of the display attributes for the rotation speed of the spindle are prepared. Compared with FIG. 3 illustrating the prior art, working condition classification numeric data REF is added to the respective numeric data as a new display attribute. In addition, the display color CLR of FIG. 3 is replaced by a display color CLR1 of a working condition 1, a display color CLR 2 of a working condition 2 and a display color CLR 3 of a working condition 3. The remaining display attributes are the same as those in FIG. 3 and no description thereof will therefore be given. In FIG. 7, the attribute AT' in the expression (2), for example, indicates an arrangement consisting of the display attributes for a numeric data specified by the subscript j=2. The name (label name) of an axis "Z" and the present position of the Z axis are outputted in a 64-dot font from a coordinate (100, 300) on the image thereof. As for a display color, in this case, one of the display color CLR1 of the working condition 1, the display color CLR2 of the working condition 2 and the display color CLR3 of the working condition 3 is selected according to the value of the working condition classification numeric data REF.

Figure 8:
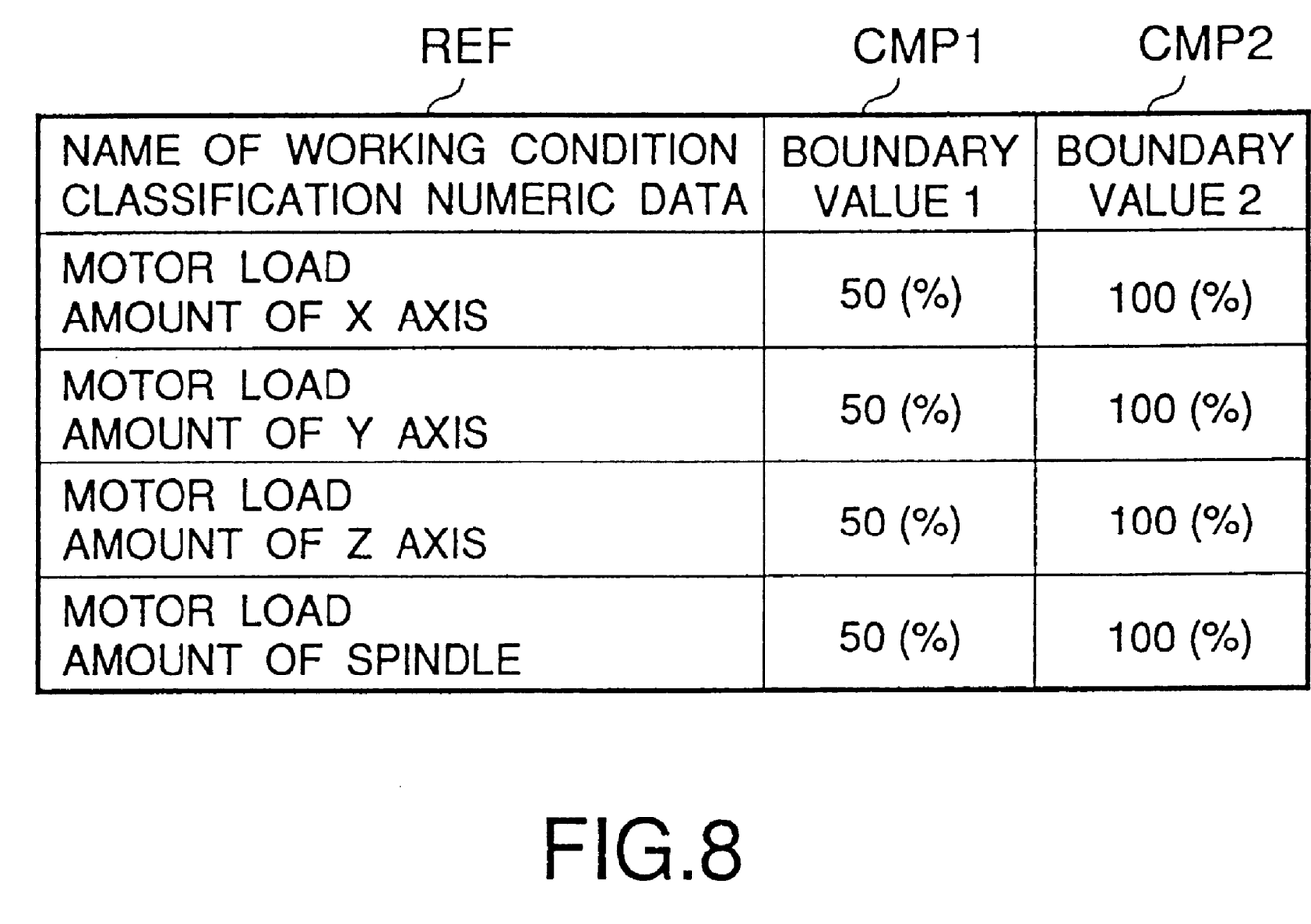
FIG. 8 shows an example of information used for classifying working conditions in the apparatus according to the present invention.

FIG. 8 shows an example of the working condition classification information CLS wherein boundary values CMP1 and CMP2 for classifying the second set of working conditions into three parts are set in advance for the motor load amounts of the X axis, Y axis, Z axis and the spindle, respectively. As for the motor load of the Z axis, for example, if it is less than 50(%), the working condition is defined as the working condition 1, if not less than 50(%) and less than 100(%), it is defined as the working condition 2 and if not less than 100(%), it is defined as the working condition 3.

Referring back to FIG. 6, the subscript "j" in the above expression (2) is initialized to "0" (Step S102). It is then examined whether or not the name NAM of numeric data AT'(0) consisting of the display attributes of the numeric data is blank (Step S103). If the name NAM of the numeric data DAT is not blank, the boundary values CMP1 and CMP2 of the corresponding numeric data DAT are extracted from the working condition classification information CLS (Step S104).

The numeric data DAT is compared with the extracted boundary value CMP1 (Step S105). If the numeric data DAT is less than the boundary value CMP1, the display attribute change information CHG is set to CLR1 (in Step S106). If the numeric data DAT is not less than the boundary value CMP1, the numeric value DAT is compared with the boundary value CMP2 (in Step S107). If the numeric data DAT is less than the boundary value CMP2, the display attribute change information CHG is set to CLR2 (in Step S108). If the numeric data DAT is not less than the boundary value CMP2, the display attribute change information CHG is set to the display color CLR 3 (Step S109).

The display colors are specified according to the display attribute change information CHG and the numeric data DAT are displayed based on the respective display attributes of the numeric data AT'(0) (Step S110). Thereafter, one is added to the subscript "j" and the process returns to the Step S103 (Step S111). If no numeric data to be displayed exists, the display process is finished at the Step S103.

Figure 9:
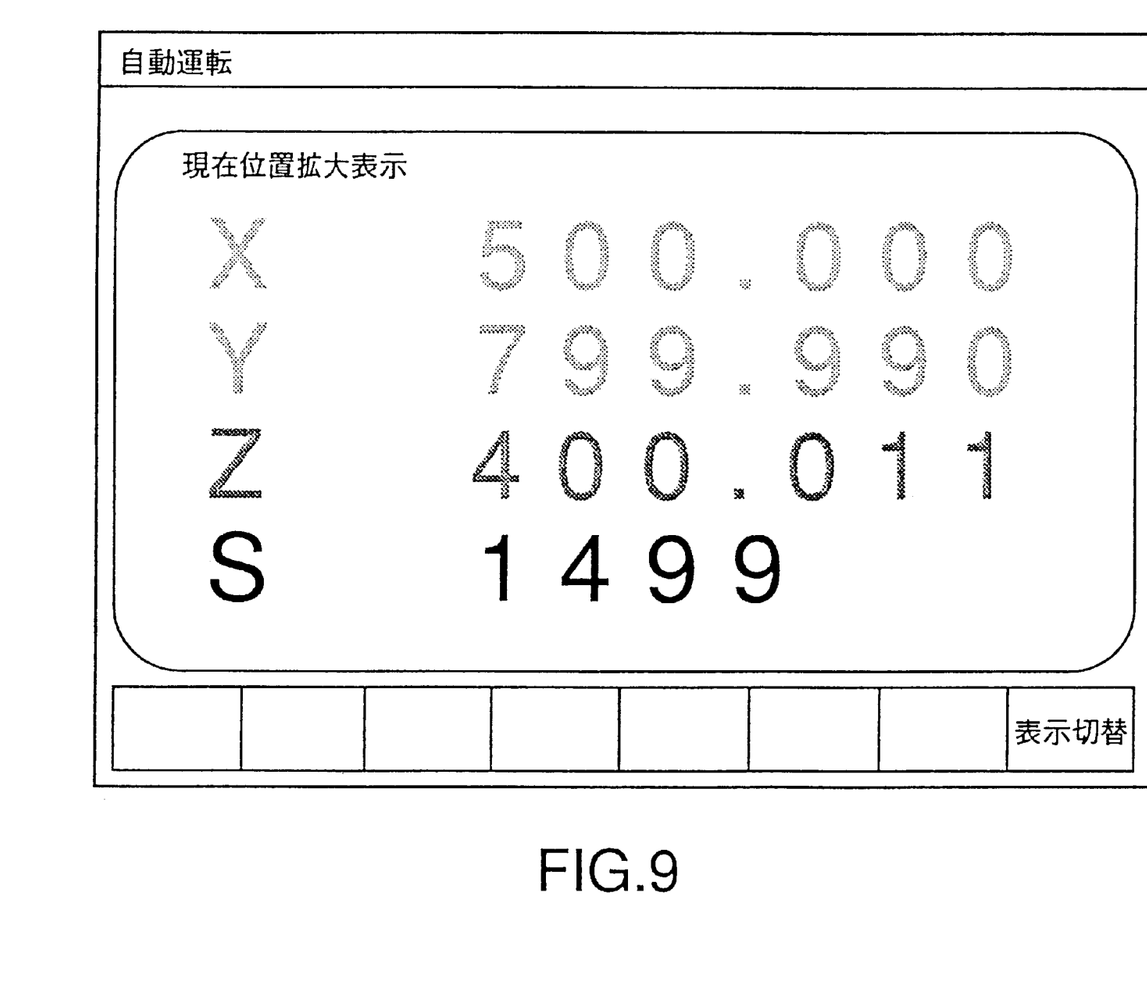
FIG. 9 shows an example of the display of the apparatus according to the present invention.

FIG. 9 shows an example of the display of the numeric data as an image by the process shown in FIG. 6. In FIG. 9, the first set of working conditions being the present positions of the X axis, the Y axis and the Z axis as well as the rotation speed of the spindle, are displayed in a 64-dot font based on the respective display attributes shown in FIG. 7. The display colors of the present positions of the X and Y axes are light gray. This indicates that the motor load amounts of the X and Y axes are less than 50(%). On the other hand, the display color of the present position of the Z axis is dark gray. This indicates that the motor load of the Z axis is not less than 50(%) and less than 100(%). The display color of the rotation speed of the spindle is black. This indicates that the motor load amount of the spindle is not less than 100(%).

In the embodiment according to the present invention, the second set of working conditions are classified in accordance with the motor load amounts of the feed rod and rotation shaft. It is also possible to classify the working conditions of the feed rod depending on the cutting feed and the rapid traverse, and to classify those of the rotation shaft in accordance with the rotation direction. Moreover, not only the display color, but also the brightness, the type and size of the font, the character flashing intervals and the like, can be modified in accordance with the classified working conditions of the machine. At this time, it is possible to classify working conditions multidimensionally by combining a plurality of display attributes.

As described above, according to the numerical control apparatus having a numeric data display function of the present invention, it is possible to display a plurality of sets of working conditions of a machine on a single image display simultaneously. As a result, even if the small amount of character information is displayed on the image to give priority to visibility, it is possible to obtain more information. Therefore, it is not necessary for an operator to leave the working place to confirm the working condition, thereby contributing to an improvement in the operator's working efficiency.

What is claimed is:

1. A numerical control apparatus for use with a machine tool having a feed rod and a rotational shaft, the numerical control apparatus comprising:

an input device;

a display device;

interpretation means for interpreting an input from said input device;

storage means for storing a plurality of display attributes;

determination means for determining a designated display attribute from the plurality of display attributes stored in said storage means in accordance with the interpretation of the input by said interpretation means;

detection means for detecting first and second sets of working conditions of at least one of the feed rod and the rotational shaft of the machine tool;

classification information storage means for storing classification information of the second set of working conditions of at least one of the feed rod and the rotational shaft;

change information determination means for classifying the second set of working conditions detected by said detection means as change information in accordance with the classification information stored in said classification information storage means; and control means for displaying on said display device the first set working conditions detected by said detection means in accordance with both the designated display attribute determined by said determination means and the change information classified by said change information determination means.

2. The numeric control apparatus according to claim 1, wherein the first set of working conditions comprises at least one of a position of the feed rod and a rotation speed of the rotational shaft.

3. The numeric control apparatus according to claim 2, wherein the second set of working conditions comprises a load amount of at least one motor.

4. The numerical control apparatus according to claim 2, wherein the classification information further comprises names describing aspects of at least one of the feed rod and the rotational shaft, and also display colors.

5. The numerical control apparatus according to claim 4, wherein the classification information further comprises boundary values for motor loads associated with an X axis, a Y axis, a Z axis and a spindle.

6. The numeric control apparatus according to claim 1, wherein the first set of working conditions contains working conditions which are different than working conditions contained in the second set of working conditions.

7. The numerical control apparatus according to claim 1, wherein the change information comprises display attributes associated with the second set of working conditions.

8. The numeric control apparatus according to claim 7, wherein the display attributes comprise display colors representing a load amount of at least one motor.

9. The numerical control apparatus according to claim 1, wherein the second set of working conditions of the feed rod comprises at least one of a motor load, a cutting feed and a rapid traverse.

10. The numerical control apparatus according to claim 1, wherein the first set of working conditions of the rotational shaft comprises rotational direction.

11. A numerical control apparatus for use with a machine tool having a feed rod and a rotational shaft, the numerical control apparatus comprising:

an input device;

a display device;

an interpretation device electrically connected to said input device, said interpretation device operable to interpret an input from said input device;

a first memory which stores a plurality of display attributes;

a determination device electrically connected to said first memory, said determination device operable to determine a designated display attribute from the plurality of display attributes stored in said first memory in accordance with the interpretation of the input by said interpretation device;

a detector operable to detect first and second sets of working conditions of at least one of the feed rod and the rotational shaft of the machine tool;

a second memory which stores classification information of the second set of working conditions of at least one of the feed rod and the rotational shaft;

a change information determination device electrically connected to said detector and said second memory, said change information determination device operable to classify the second set of working conditions detected by said detector as change information in accordance with the classification information stored in said classification information storage device; and a controller electrically connected to said detector, said determination device, said change information determination device, and said display device, said controller operable to display on said display device the first set working conditions detected by said detector in accordance with both the designated display attribute determined by said determination device and the change information classified by said change information determination device.

12. The numeric control apparatus according to claim 11, wherein the first set of working conditions comprises at least one of a position of the feed rod and a rotation speed of the rotational shaft.

13. The numeric control apparatus according to claim 12, wherein the second set of working conditions comprises a load amount of at least one motor.

14. The numerical control apparatus according to claim 12, wherein the classification information further comprises names describing aspects of at least one of the feed rod and the rotational shaft, and also display colors.

15. The numerical control apparatus according to claim 14, wherein the classification information further comprises boundary values for motor loads associated with an X axis, a Y axis, a Z axis and a spindle.

16. The numeric control apparatus according to claim 11, wherein the first set of working conditions contains working conditions which are different than working conditions contained in the second set of working conditions.

17. The numerical control apparatus according to claim 11, wherein the change information comprises display attributes associated with the second set of working conditions.

18. The numeric control apparatus according to claim 17, wherein the display attributes comprise display colors representing a load amount of at least one motor.

19. The numerical control apparatus according to claim 11, wherein the second set of working conditions of the feed rod comprises at least one of a motor load, a cutting feed and a rapid traverse.

20. The numerical control apparatus according to claim 11, wherein the first set of working conditions of the rotational shaft comprises rotational direction.

* * * * *